INVENTOR
PHILIP ALEXANDER CAMPBELL
BY
ATTORNEYS

July 1, 1930. P. A. CAMPBELL 1,769,254
POWER DRIVEN MOWER
Filed Oct. 29, 1926 3 Sheets-Sheet 2

INVENTOR
PHILIP ALEXANDER CAMPBELL
BY Fetherstonhaugh & Co
ATTORNEYS

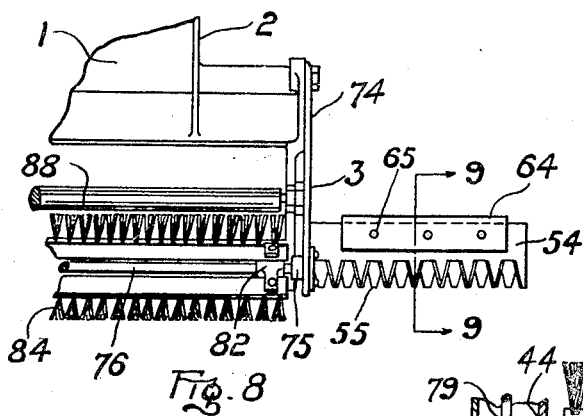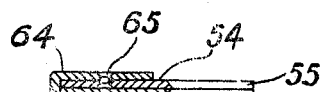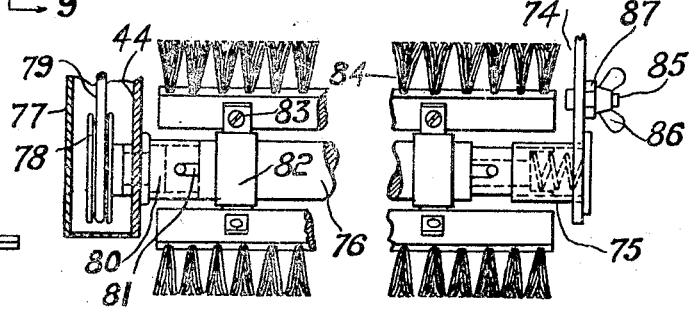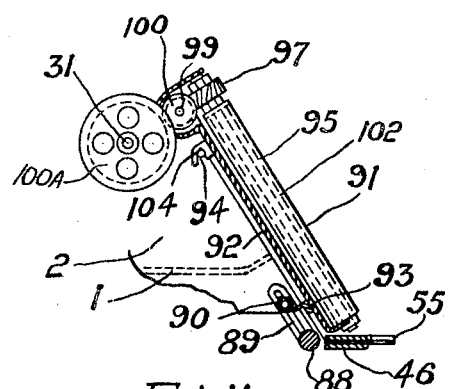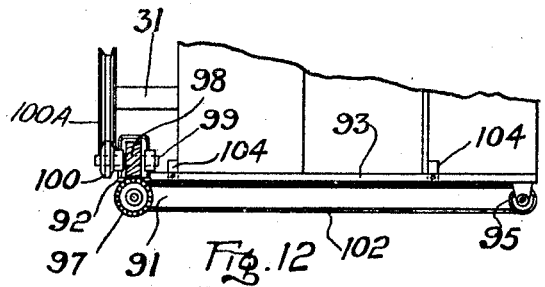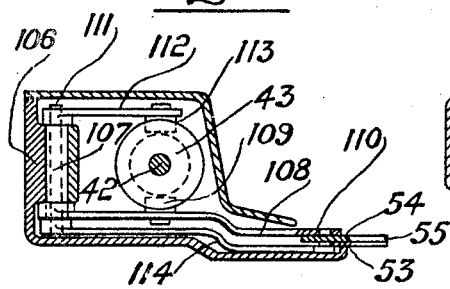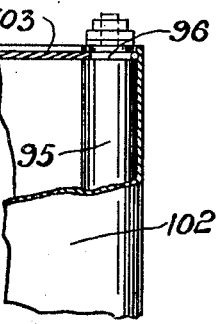

Patented July 1, 1930

1,769,254

UNITED STATES PATENT OFFICE

PHILIP ALEXANDER CAMPBELL, OF VANCOUVER, BRITISH COLUMBIA, CANADA

POWER-DRIVEN MOWER

Application filed October 29, 1926. Serial No. 145,052.

My invention relates to improvements in power driven mowers which has for its particular objects the provision of means whereby the mower may cut a swath of equal or greater width than the width of the mower wheels, whereby the substitution of sickle knives having different length of cutting strokes may be readily accomplished, whereby provision is made for independently driving the cutting knives and the mower wheels, whereby the grass brush may be arranged to throw the grass cut in a horizontal plane or a substantially vertical plane as required; to provide a detachable conveyor belt for use in discharging long grass to one side of the path of the mower that it may be readily gathered as desired; and whereby a pulley is provided for driving other devices.

The invention consists essentially of a mower having a pair of wheels capable of being clutch driven from a gasoline, electric or other motor and having a pair of sickle knives capable of reciprocation from the same source of power, as will be more fully described in the following specification, in which:—

Fig. 8 is a fractionated plan view of the mower showing the knives extending beyond the width of the machine.

Fig. 9 is a sectional view taken on the line 9—9 of Figure 8.

Fig. 10 is a view showing the detachable mounting of the grass brush.

Fig. 11 is an end view of the grass conveyor mechanism.

Fig. 12 is a plan view of the grass conveyor mechanism.

Fig. 13 is an enlarged view of the conveyor roller and belt.

Fig. 14 is a sectional view of a modified knife drive.

Fig. 15 is a plan view of same.

Fig. 16 is a sectional view of the knives as arranged to cut the grass very close to the ground.

In the drawings like characters of reference indicate corresponding parts in each figure.

Figure 1:
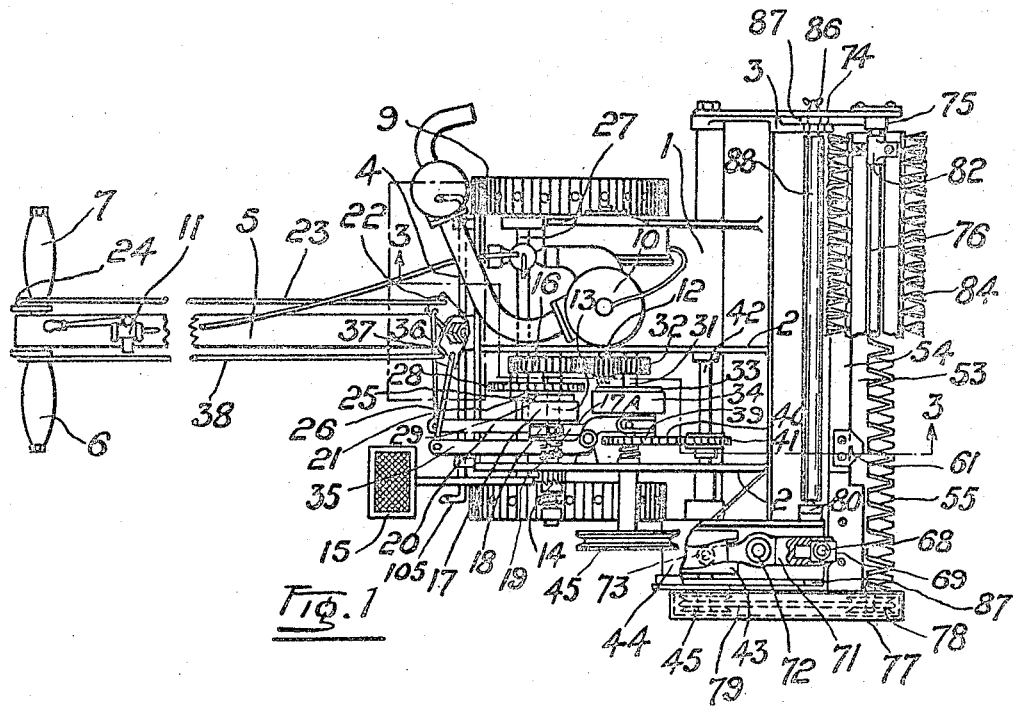
Fig. 1 is a plan view of the mower certain parts being broken away.
Figure 2:
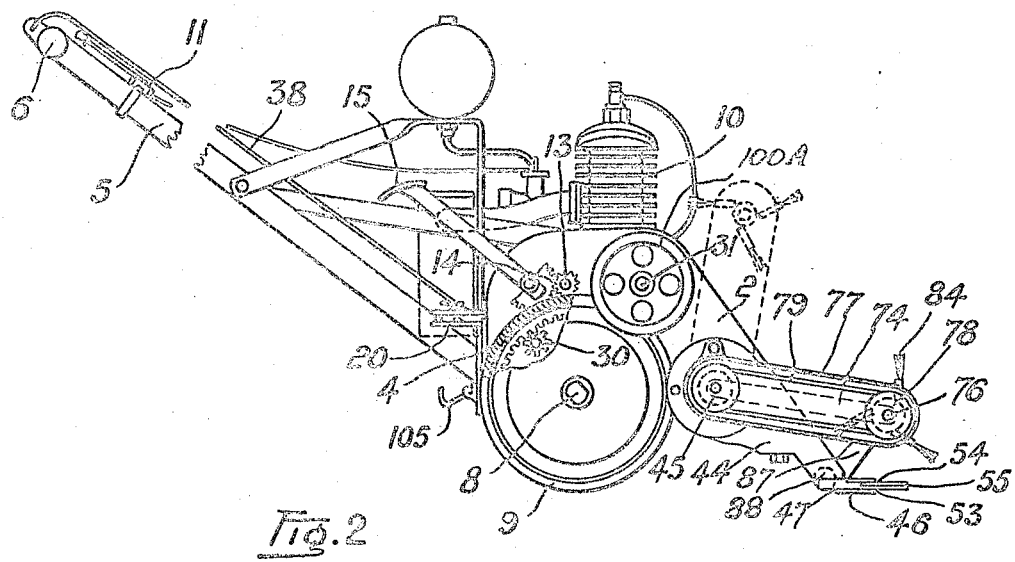
Fig. 2 is a side elevation of the mower showing the brush driving belt cover removed.
Figure 17:
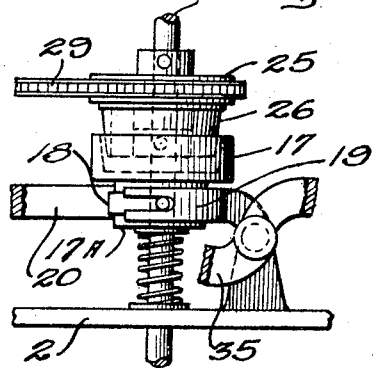
Figure 17 is a plan view of a mower wheel drive clutch assembly.

The numeral 1 indicates generally a bed plate having a pair of upstanding webs 2 between which the driving mechanism of the mower is mounted and a pair of forwardly projecting arms 3 which support the sickle bar and brush mechanism. At the rear of the bed plate 1 is a back plate 4 to which a handle 5 is secured, which handle is provided with a pair of semi-rotary hand grips 6 and 7 the purpose of which will hereinafter appear. Projecting from the ends of the bed plate 1 are stub shafts 8 upon which a pair of road wheels 9 are mounted. The wheels 9 are each provided with an internal ring gear through which they are driven.

The numeral 10 indicates a gasoline or other motor having a suitable control 11 upon the handle 5 convenient to the operator, and 12 is the driving pinion. The numeral 13 is a countershaft through which the driving power of the motor is communicated to the road wheels 9 and is provided with a suitable ratchet mechanism 14 actuated by a pedal 15 by which the motor is started and with a gear wheel 16 which is in mesh with the drive pinion 12. Slidably keyed to the countershaft 13 is a spring tensioned clutch collar 17 having a peripherally grooved extension 17A fitted with a trunnioned collar 18, which trunnioned collar is engaged by a yoke 19 suitably fulcrumed from the end web member 2 and connected to a lever 20, which in turn is connected by a rod 21 to one side of a bell crank 22, the other side of the crank being connected by a rod 23 to the semi-rotary hand grip 7, as at 24. Freely mounted upon the countershaft 13 but held against endwise movement is a sprocket 25 connected to a clutch cone 26 which is adapted to be engaged by the clutch collar 17.

The numeral 27 indicates a shaft suitably journalled above the bed plate 1 which is provided with a sprocket 28 operatively connected by a chain 29 to the sprocket 25 of the countershaft 13. At the ends of the shaft 27 and in operative engagement with the ring gear of the road wheels 9 are ratchet pinions 30 which are adapted to transmit a forward driving power to the wheels from the motor when the clutch assembly is in engaged position and to allow the wheels to be rotated freely in a forward direction.

The numeral 31 indicates a second countershaft journalled between the webs 2 of the bed plate 1, at the inner end of this shaft a gear 32 is fitted which is in mesh with the drive pinion of the motor 10, also mounted on the shaft is a clutch cone 33 which is adapted to be engaged by a spring tensioned clutch collar 34 slidably mounted upon the shaft and actuated by a forked lever 35 which is connected through a rod 36 to one leg of a bell crank 37 and from the other leg through a rod 38 to an offset lug on a pivotally mounted hand grip 6. Secured to the clutch collar member 34 is a sprocket 39 connected by a chain 40 to a driven sprocket 41 upon a shaft 42, one end of which projects beyond the bed plate 1 and is provided adjacent its outer end with a peripheral cam 43. The cam 43 is enclosed in a housing 44 having a suitable detachable cover, so that access may be conveniently obtained to the cam and its co-acting parts. On the extreme outer end of the shaft 42 is a pulley 45, shown in dotted line in Figure 1, the purpose of which will hereinafter appear.

Figure 5:
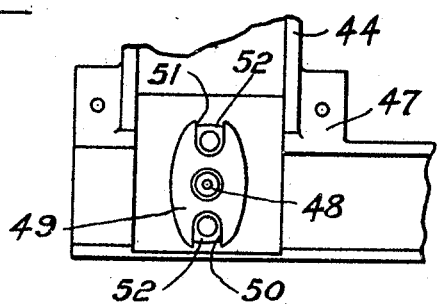
Fig. 5 is a detailed view of the knife reciprocating rocker.

The numeral 46 indicates a sickle supporting plate connected at opposite ends to the arms 3 of the bed plate 1 as at 47. This plate is provided with a recess, see Figure 5, having an upstanding pin 48 upon which a rocker 49 is mounted, the rocker is provided with end slots 50 and 51 which are adapted to receive apertured sliding collars 52.

The numeral 53 indicates generally the bottom sickle knife and 54 the top sickle knife, both of which are formed from a strip of sheet steel and are provided with tapered and bevelled cutters 55. Both knives are provided with corresponding slots 56 cut longitudinally therein and are adapted to slidably engage rectangular guide blocks 57 secured to the sickle blade support 46, the knives being held down upon the plate 46 by washer 58 secured to the top of the guide blocks 57 by a screw 59.

Figure 7:
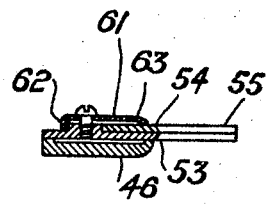
Fig. 7 is a section taken on the line 7—7 of Figure 4.

As a means of holding the sickle knives 53 and 54 in proper cutting contact with each other, the top knife 54 is cut away along a portion of its rear edge as at 60 and spring clips 61 are screwed thereto, which are adapted to bear at their rear edge upon the bottom knife 53 as at 62, see Figure 7, and to resiliently bear upon the upper knife 54 as at 63.

Figure 6:
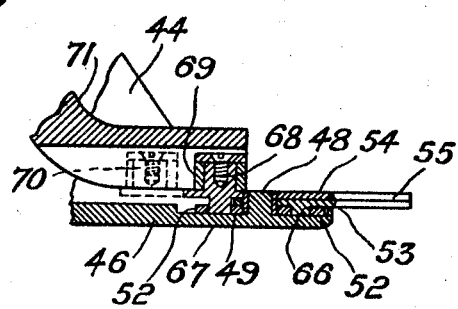
Fig. 6 is a detailed sectional view taken on the line 6—6 of Figure 4.

When it is desired to use a pair of knives of a length greater than the width of the mower, I provide a U-shaped strip 64, see Figures 8 and 9, upon the extended or overhanging portion of the knives, which is adapted to engage the top side of knife 54 and the underside of the knife 53 and fasten the strip by screws or rivets 65 to one of them. This U-shaped strip serves as a guide for one knife while reciprocating with the other and also forms a strengthening member for both, giving to the overhanging portion of the knives great strength to withstand the strains imposed upon them in a vertical and horizontal direction. Adjacent one end of the lower knife 53 is a downwardly projecting pin 66 which fits into the sliding collar 52 in the slot 50 of the rocker 49 and at the corresponding end of the knife 54 a downwardly projecting pin 67 projects in a similar manner into the collar 52 of the slot 51 of the rocker 49, so that as the rocker is oscillated equal reciprocatory motion is imparted to the knives in opposite directions. On the upper surface of the knife 54 is a further pin 68 which is fitted with a suitable bearing block 69. In view of the fact that certain grasses require to be cut with knives having a relatively short stroke, I provide some of the knives with a pin which is set on a projection extending from the rear thereof such as is indicated in dotted line in Figure 6, and is numbered 70, thus reducing the effective length of the lever 71.

The numeral 71 indicates generally a cranked rocking lever mounted upon a bearing 72 carried in the housing 44. The rear end of the lever is provided with a roller 73, indicated by dotted line in Figure 1, which engages the underside of the cam 43. The outer end of the lever 71 is longitudinally grooved on its underside to fit over the pin 68 or 70 of the upper sickle knife 54, so that as the rocking lever 71 is oscillated by the rotation of the cam 43 reciprocation is imparted to the upper knife 54 and from it through the rocker 49 as previously described to the lower knife 53.

Figure 3:
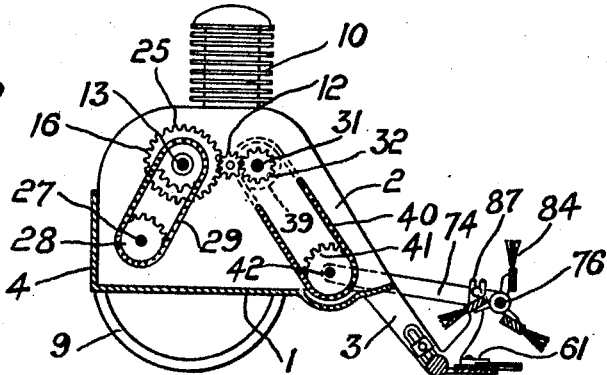
Fig. 3 is a sectional view taken on the line 3—3 of Fig. 1.
Figure 4:
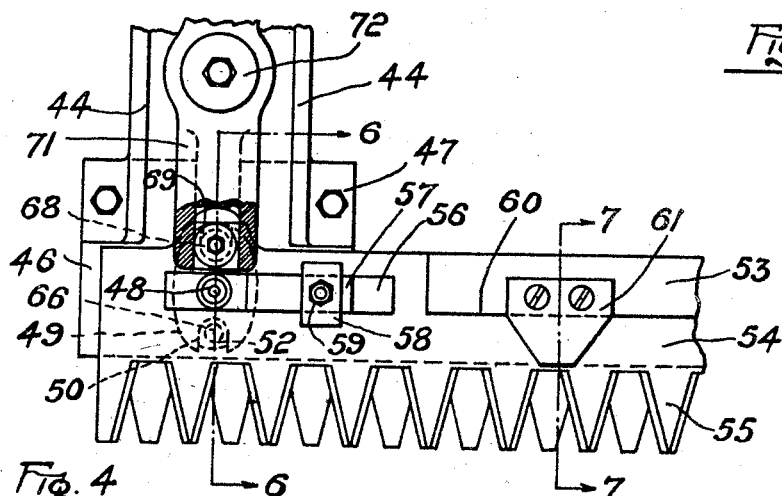
Fig. 4 is a detailed plan view of the sickle knives showing the reciprocating mechanism.

Hingedly mounted upon the front of the bed plate 1 is an arm 74 at the free end of which is a socket 75, see Figure 10, carrying a spring pressed rotatable collar which is adapted to detachably support a rotary brush spindle 76. Swingingly mounted upon the outer side of the housing 44 is a belt casing 77 in the free end of which a pulley 78 is rotatably mounted, which is driven by a belt 79 from the pulley 45. Rotatable with the pulley is a collar 80 which is provided with a pair of opposed slots 81. The brush spindle 76 is provided adjacent each end with a transverse pin, which is adapted to be engaged by the slots 81 of the collar, so that rotation may be imparted to the spindle from the pulley 78. The brush spindle is fitted with a plurality of spiders 82 having tangentially projecting legs 83 to which elongated brushes 84 are fitted. The purpose of disposing the brushes tangentially is so that when the tangent is directed against rotation, or trailing, as shown in Figure 3, the grass as it is cut by the knives is thrown horizontally under the bed plate 1, but if a grass box should be fitted over, or forward of the knives, by reversing the brushes so that the tangent is in the direction of rotation, the grass would be carried around by the brushes and thrown in a vertical or forwardly inclined direction. The hinged arm 74 and the belt casing 77 are adapted to be secured in operating position by a pair of bolts 85 clamped by thumb nuts 86 to a pair of forks 87 one of which extends upwards from the arm 3 and the other from the housing 44.

The numeral 88 is a roller adapted to support the front of the mower which is rotatably mounted between a pair of slides 89 adjustably secured by bolts 90 between the arm 3 and the housing 44.

The numeral 91 indicates generally a detachable grass conveyor having a frame comprising vertical members 92 and a pair of horizontal members 93, the upper of which is adapted to rest on a pair of lugs 94 upon the webs 2 of the bed plate 1. Suitably journalled between opposing ends of the vertical members is a pair of rollers 95 having a peripheral groove 96 adjacent their upper ends, the purpose of which will hereinafter appear. Secured to the upper end of one of the rollers is a spiral pinion 97 which engages a suitably journalled corresponding spiral gear 98 keyed to a short shaft 99 having a friction wheel 100 at its outer end, which wheel is adapted to engage a pulley 100A upon the outer end of the second countershaft 31 to impart rotation to the rollers. The pulley 100A also serves as a means whereby the mower may be used for the purpose of driving other light machines, such as a churn or grindstone.

The numeral 102 indicates a conveyor belt of canvas or other suitable material, having on its inner side an endless cord 103 sewn thereto, which cord is adapted to engage the grooves 96 of the rollers to prevent the belt sliding downwards therealong. The numeral 104 indicates a pair of hook members which are adapted to overhang the lugs 94 to hold the conveyor detachably in position.

The road wheels 9 are provided at intervals with peripheral apertures, which are adapted to be engaged by pivotally mounted hooks 105 secured to the rear of the back plate 4 so that the wheels of the mower may be locked against rotation when it is desired to use the pulley 45 for driving other machinery.

In the modified movement for reciprocating the sickle knives 53 and 54, see Figures 14 and 15, the housing 44 is provided at its rear end with a vertical bearing 106 in which a sleeve 107 having a lever 108 at its base is rockingly mounted. Intermediate the length of the lever is an upstanding roller 109 engaging the sides of the groove of the cam 43, the free end of the lever being forked at 110 to engage the upstanding pin on the knife 54. Within the sleeve 107 a shaft 111 is rockingly mounted, which is provided at its upper end with a lever 112 having a roller 113 at its outer end engaging the sides of the groove of the cam 43. At the lower extremity of the shaft 111 is a further lever 114 which is forked at its free end to engage the downwardly projecting pin of the lower knife 53.

As a means of providing for the cutting of grass closely to the sod, I provide a pair of sickle knives each formed of two parts, as shown in Figure 16, in which the lower knife is formed with a bearing portion 115 mounted for reciprocation upon the sickle supporting plate 46 and a cutting portion 116 secured to the bearing portion in a plane substantially equal to the underside of the plate 46. The upper knife is formed in a similar manner with a rear portion 117 surmounting the portion 115 of the lower knife and a cutting portion 118 secured to and in a lower plane to the rear portion.

It will thus be seen that I have invented a power driven mower which will cut close up to fences or borders, and which will cut grass of any height or kind, effecting its cutting at any desired distance above the sod, also that provision is made in the mower for increasing the width of the cut of the machine by the simple substitution of one set of sickle knives for another.

What I claim as my invention is:

1. A mower having a base mounted on road wheels and having a sickle supporting plate extending across the front of the base, reciprocating sickle knives extending throughout the length of the supporting plate and extending therebeyond, and means for reciprocating the knives, and a U-shaped member secured to the extended end of one of the sickle knives forming a slide for the extended end of the other knife.

2. A mower having a base mounted on road wheels and having a sickle supporting plate extending across the front of the base, reciprocating sickle knives extending throughout the length of the supporting plate and extending therebeyond, means for reciprocating the knives and means for connecting the extended portion of the knives together to form a support therefor.

3. A mower having a base mounted on road wheels and having a sickle supporting plate extending across the front of the base, reciprocating sickle knives extending throughout the length of the supporting plate and extending therebeyond, means for reciprocating the knives, and means for connecting the extended portion of the knives together to form a support therefore, said means comprising a U-shaped strip embracing the rear edges of both knives and attached to one of them.

4. In a mower having a pair of reciprocating sickle knives adapted to be moved in opposite directions, and means secured to one of said knives for holding it under spring tension in intimate contact with the other.

Dated at Vancouver, B. C., this 18th day of October, 1926.

PHILIP ALEXANDER CAMPBELL.